March 3, 1964 W. S. EGGERT, JR., ETAL 3,122,982

ROOF VENTILATION DAMPER ASSEMBLY

Filed Oct. 20, 1961 2 Sheets-Sheet 1

INVENTORS
Walter S. Eggert, Jr.
BY David L. Buchanan
Wm. R. Glisson
ATTORNEY

March 3, 1964 W. S. EGGERT, JR., ETAL 3,122,982
ROOF VENTILATION DAMPER ASSEMBLY
Filed Oct. 20, 1961 2 Sheets-Sheet 2
FIG. 3
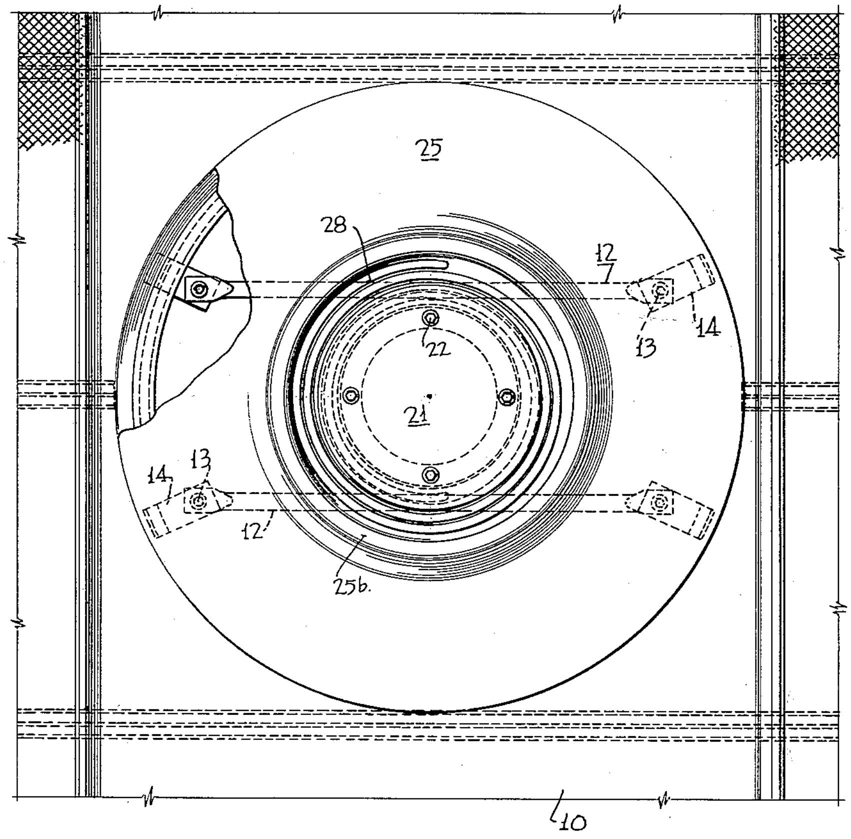
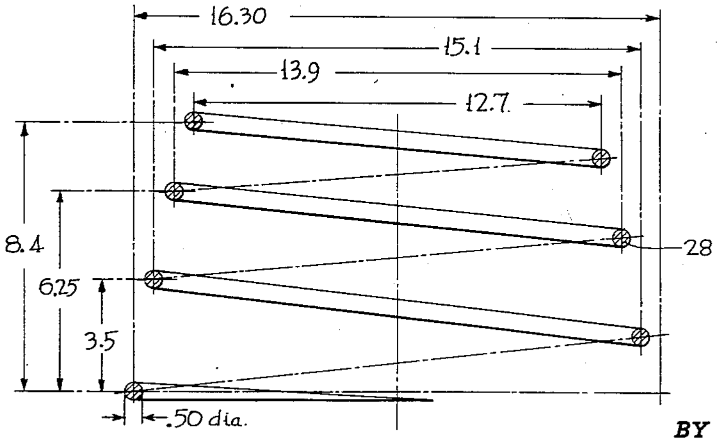
FIG. 4
INVENTORS.
Walter S. Eggert, Jr.
BY David L. Buchanan
Wm. R. Glisson
ATTORNEY 3,122,982

ROOF VENTILATION DAMPER ASSEMBLY

Walter S. Eggert, Jr., Philadelphia, and David L. Buchanan, Whitemarsh, Pa., assignors to The Budd Company, Philadelphia, Pa., a corporation of Pennsylvania Filed Oct. 20, 1961, Ser. No. 146,606
6 Claims. (Cl. 98—13)

This invention relates to a roof ventilation damper assembly and has for an object the provision of improvements in this art.

One of the particular objects is to provide a ventilation damper assembly which controls a large volume of air by a relatively small movement of the damper.

Another object is to provide a damper which moves readily between open and closed positions and firmly maintains its position at either end of its movement.

Another object is to provide effective sealing means for a damper at the ends of its stroke without the use of sliding sealing means.

Another object is to provide an improved power operator for a damper which can expand axially through a considerable distance and which can collapse into a very small space.

The above and other objects of the invention will be apparent from the following description of an exemplary embodiment, reference being made to the accompanying drawings, wherein:

FIG. 3 is a top plan view; and

FIG. 4 is a side elevation of the damper operating spring.

Figure 1:
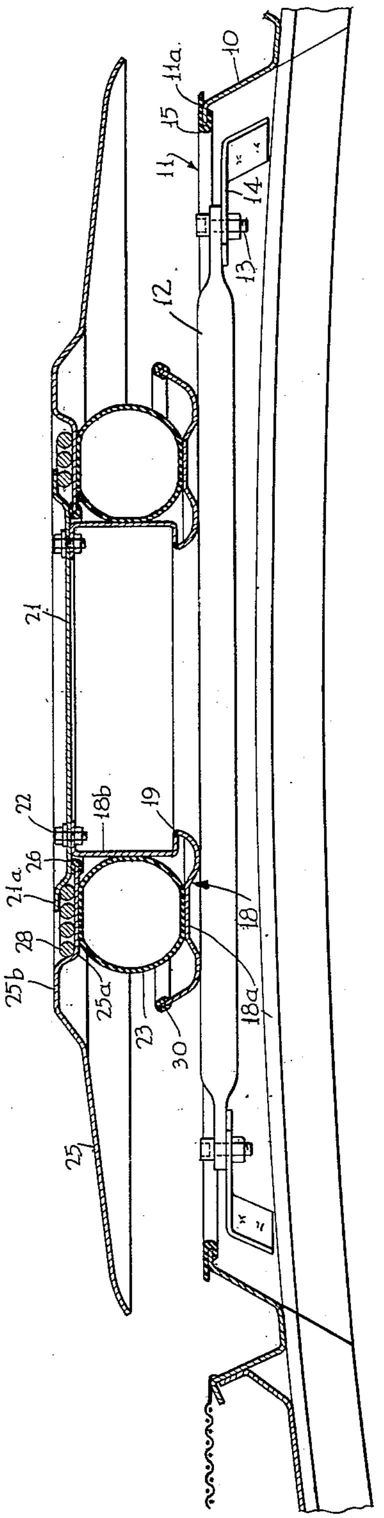
FIG. 1 is a vertical section taken on the line 1—1 of FIG. 3, with the damper in open position.
Figure 2:
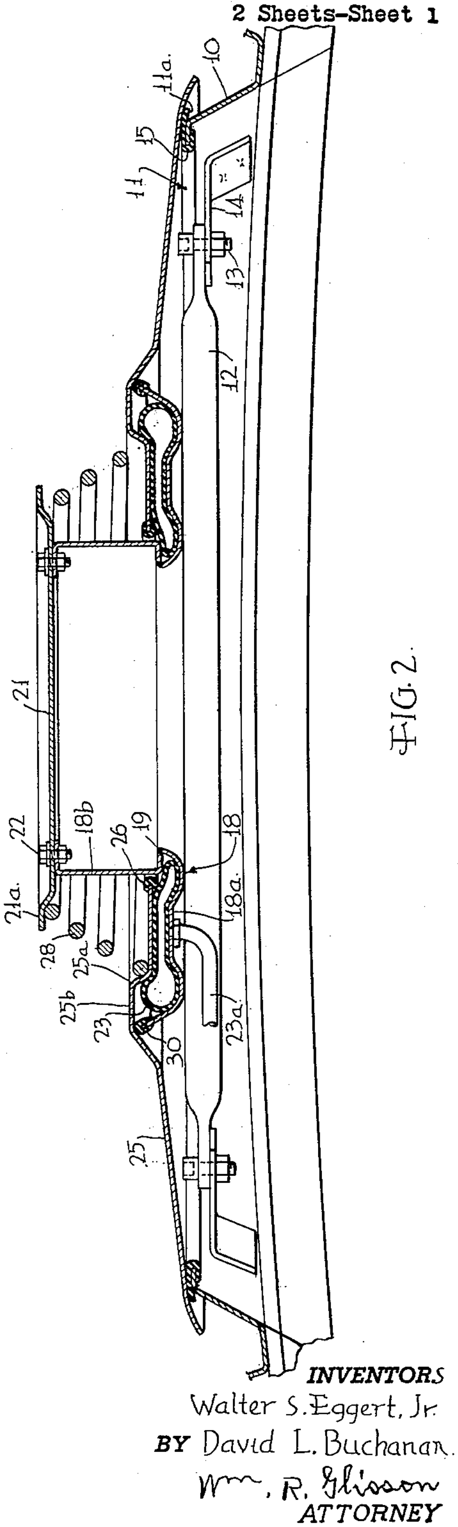
FIG. 2 is a view like FIG. 1 with the damper in closed position.

The damper assembly is mounted on a roof sheet 10 having an opening 11 with a marginal flange 11*a* across which are secured damper supporting bars 12. The bars are spaced apart laterally so as to provide a stable support and are detachably secured, as by bolts 13, to brackets 14 mounted on the sides of the opening. The bars 12 are shorter than the width of the opening where they are located to permit the whole assembly to be removed by upward movement from the outside of the enclosure, such as a vehicle, on which the damper assembly is mounted.

The edge of the marginal flange 11*a* defining the opening is provided with an annular channel-shaped sealing strip 15, as of rubber, for cooperation with a damper plate. The sealing strip is resilient so that when pushed in on the edge of the flange it maintains its position; but it may be secured, as by adhesive or other means, if desired.

A damper support 18 is secured on the bars 12 by any suitable means, the base plate portion 18*a* of the support preferably being annular; and at a distance inward from the outer edge of the base plate there is secured, as by welding 19, to its turned up inner edge, a cylindrical core spacer or member 18*b*. The member 18*b* is channel-shaped in toric section with the channel facing inwardly so as to provide a smooth outer surface.

A cap plate 21 is secured, as by bolts 22, to the top of the cylindrical member 18*b*, the outer edge 21*a* of the cap plate extending out over the outer edge of the cylindrical member.

The intermediate portion of the annular base plate 18*a* is raised and supports a damper operator 23, which here is formed as an annular or toric pneumatic member similar to the inner tube of a tire, the operator on its lower side being secured, as by adhesive, to the base plate 18*a* and at its upper side having secured thereto, as by adhesive, an annular damper plate 25.

The inner edge of the annular damper plate 25 is provided with a rub strip 26, as of low friction material such as "Teflon," adapted to engage the outersurface of the cylindrical member 18*b*. The inner periphery of the rub strip 26 is larger in diameter than the outer periphery of the cylindrical member 18*b* so as normally to be spaced therefrom, as shown, and to engage only when there is more than normal lateral or tilting movement of the damper plate and then on one side only without binding.

A helical spring 28 is arranged between the top of the damper plate 25 and the bottom of the overhanging edge 21*a* of the cap plate 21. When compressed the spring 28 forms a flat coil and the inner edge of the damper plate 25 is offset downwardly, as at 25*a* to form an annular pocket for the flattened spring; and when extended the spring 28 has unequal spacing between turns. The total length of the annular spring is very considerable and when formed with turns of variable diameter and variable axial spacing there is an approach to a condition in which there is little or no change in action of the spring between its two end positions.

For illustrative purposes one spring is shown herein which has four turns and a normal free height of 8.4" at no load, the height from the bottom to successive turns being 3.50", 6.25" and 8.4" and the turn diameters of successive turns from top to bottom being 12.7", 13.9", 15.1" and 16.3". At its working distended length of about 3" the spring exerts a pressure of 50 pounds and in its fully collapsed flat position exerts a pressure of 78 pounds. It is seen that the pressure of the spring is not very greatly changed relatively between its two extreme positions.

The outer edge of the base plate 18*a* is turned up and is provided with a sealing strip 30, as of rubber, which is adapted to engage the lower side of an annular raised portion 25*b* of the damper plate when the plate is in its lower position.

Near its outer edge the damper plate 25, when in its lower position, engages with the sealing strip 15 around the opening.

The base plate 18*a*, between its upturned inner and outer edges, forms an annular depressed seat for the annular air tube operator 23 for the damper, the space being greater near the edges to take the folded edges of the collapsed tube and the space intermediately being less.

Air is supplied to and withdrawn from the pneumatic tube 23 by way of a nipple 23*a* which is similar to the usual tire valve stem but without a valve, that being in the controls. Means outside the described assembly are provided for distending the pneumatic operator 23. The spring assures full return of the damper plate to its lower sealed position when fluid is withdrawn from the pneumatic operator.

It is thus seen that the invention provides a simple, efficient and dependable damper assembly which controls a large volume opening with a very small movement.

While one embodiment of the invention has been described in detail for purposes of illustration it is to be understood that there may be various embodiments and modifications within the general scope of the invention.

What is claimed is:

1. In a damper assembly for use with a roof sheet having an opening therein, the combination of: a damper support adapted to be mounted in a roof opening and comprising an annular base plate and a cylindrical core spacer coaxial with said base plate and extending perpendicular to the plane of a roof opening; a cap plate mounted on said core spacer and having a flange opposed to and spaced from said base plate; an annular damper plate disposed concentric to said core spacer and movable along said core spacer between said base plate and said flange; and means for moving said damper plate including an annular pneumatic tube and a return spring connected between said damper plate and said base plate and said flange.

2. A damper assembly in accordance with claim 1 wherein said return spring is a helical-coil compression spring which collapses from a distended position into a collapsed condition wherein all of its coils are substantially flat.

3. In a damper assembly for use with a roof sheet having an opening therein, the combination of: an annular base plate adapted to be mounted centrally in an opening; a core spacer mounted on said base plate; a cap plate mounted on said core spacer and having an annular flange opposed to and spaced from said base plate; an annular damper plate disposed concentric to said core spacer between said base plate and said flange, the damper plate being movable between open and closed positions and adapted to control the flow of air through said opening; and means for moving said damper plate comprising an annular pneumatic tube connected between said damper plate and one of said base plates and said flange and a helical-coil return spring connected between said damper plate and the other of said base plate and said flange.

4. A roof damper assembly comprising: a roof sheet havng an opening therein; a damper support mounted centrally within said opening and including an annular base plate and a cylindrical core spacer that extends upwardly from said base plate; a cap plate secured to the top of said core spacer and having an annular flange opposed to and spaced from said base plate; an annular damper disposed concentric to said core spacer between said flange and said base plate, said damper plate being vertically movable between an open position and a closed position for controlling the flow of air through said opening; and means for moving said damper plate between said positions including a pneumatic operator connected between said damper plate and one of said base plate and flange and a helical coil return spring connected between said damper plate and the other of said base plate and flange.

5. A roof damper assembly comprising the combination of a roof sheet having an opening therein, a cylindrical member disposed centrally within said opening, outwardly-extending flange means secured to the ends of said cylindrical member, support means extending across said opening and supporting said cylindrical member and said flange means, an annular damper plate of a size to engage the periphery of said opening and said flange means, and operating means for said damper plate including an annular pneumatic tube and a helical coil spring mounted between said flange means and said damper plate, said spring having a flat disposition when compressed.

6. A roof damper assembly comprising the combination of a roof sheet having an opening therein, a cylindrical member disposed centrally within said opening, outwardly-extending flange means secured to the ends of said cylindrical member, support means extending across said opening and supporting said cylindrical member and said flange means, an annular damper plate of a size to engage the periphery of said opening and of said flange means, and operating means for said damper plate including an annular pneumatic tube and a helical coil spring mounted between said flange means and said damper plate, said spring when compressed having a flat disposition and said tube when collapsed having an approximately flat disposition, said damper plate having an annular recess to receive said spring when flat and said flange means having an annular recess to receive said tube when collapsed, said flange means further forming a seat for one end of said spring and a stop for engagement by the inner edge of said damper plate.

References Cited in the file of this patent

UNITED STATES PATENTS

| | | |
|---|---|---|
| 1,406,783 | Tomsek | Feb. 14, 1922 |
| 2,660,946 | Peple | Dec. 1, 1953 |
| 2,881,687 | Manor | Apr. 14, 1959 |

FOREIGN PATENTS

| | | |
|---|---|---|
| 624,932 | Great Britain | June 20, 1949 |
| 715,096 | Great Britain | Sept. 8, 1954 |